Figure 1:
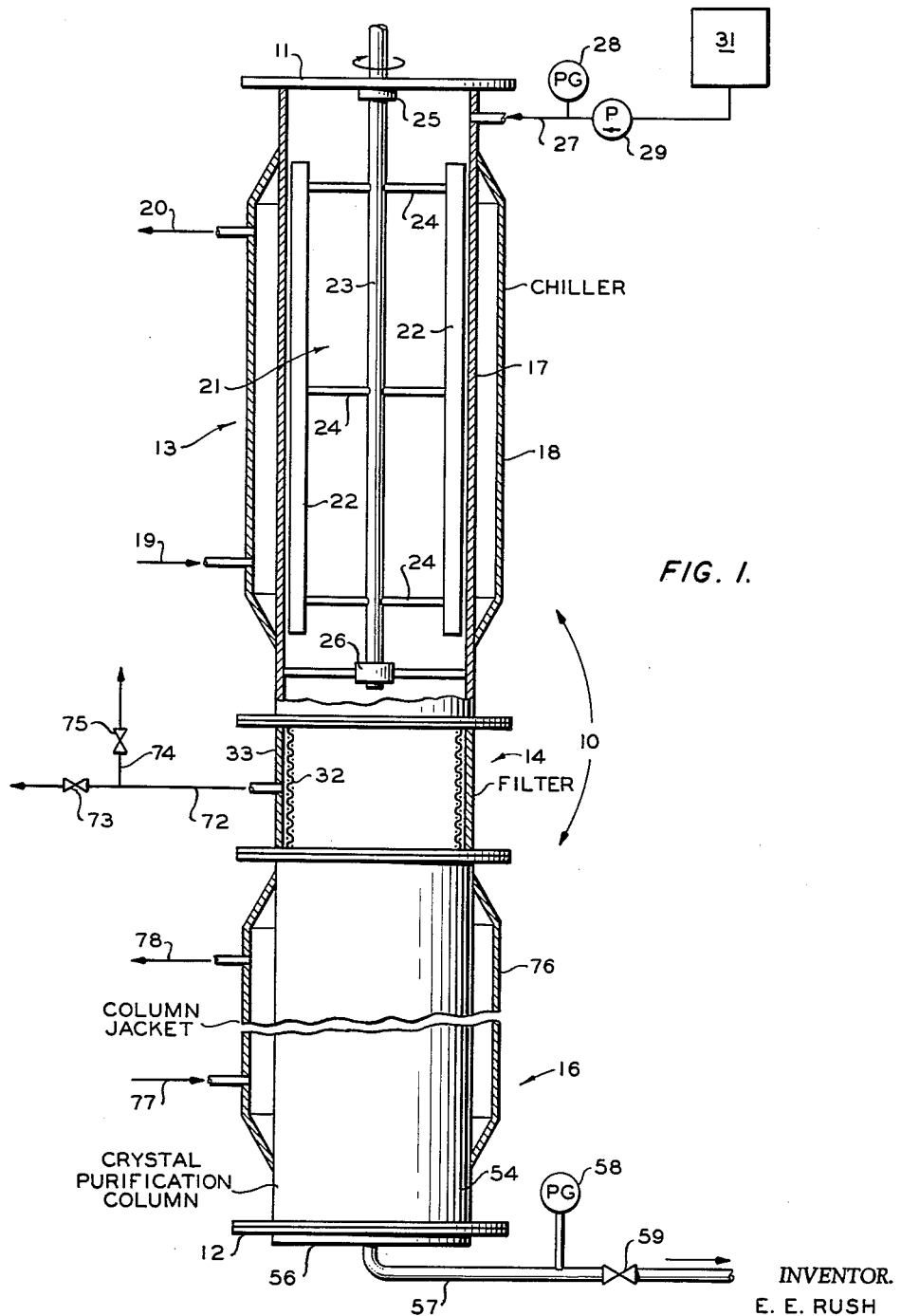

June 4, 1963 — E. E. RUSH — 3,092,673
METHOD AND APPARATUS FOR CRYSTAL PURIFICATION
Filed Oct. 28, 1957 — 7 Sheets-Sheet 1

INVENTOR.
E. E. RUSH
BY Hudson and Young
ATTORNEYS.

June 4, 1963 E. E. RUSH 3,092,673
METHOD AND APPARATUS FOR CRYSTAL PURIFICATION
Filed Oct. 28, 1957 7 Sheets-Sheet 2
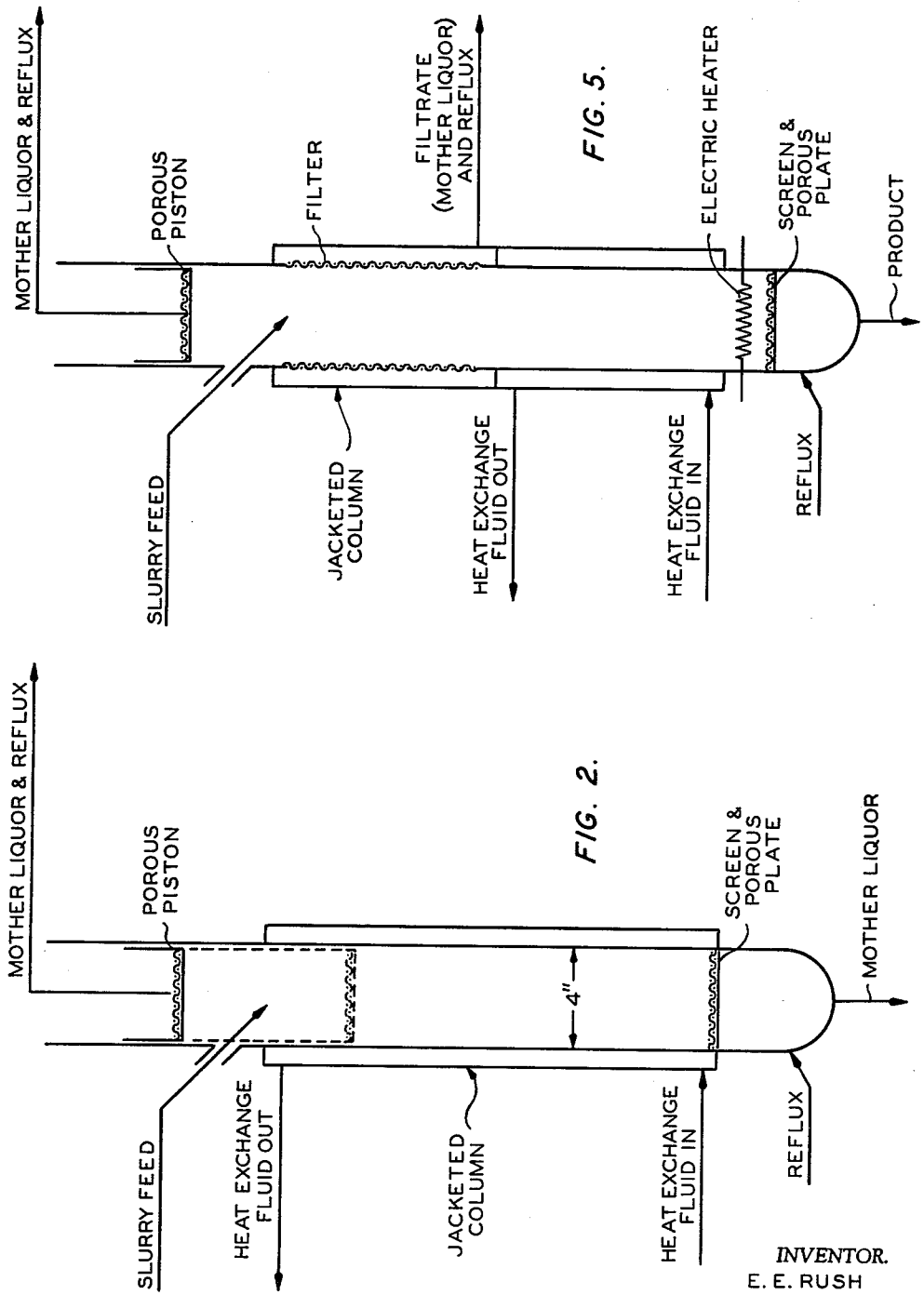
INVENTOR.
E. E. RUSH
BY
Hudson and Young
ATTORNEYS.

June 4, 1963 E. E. RUSH 3,092,673
METHOD AND APPARATUS FOR CRYSTAL PURIFICATION
Filed Oct. 28, 1957 7 Sheets-Sheet 3

INVENTOR.
E. E. RUSH
BY
Hudson and Young
ATTORNEYS.

United States Patent Office 3,092,673
Patented June 4, 1963

3,092,673
METHOD AND APPARATUS FOR CRYSTAL PURIFICATION
Elton E. Rush, McGregor, Tex., assignor to Phillips Petroleum Company, a corporation of Delaware
Filed Oct. 28, 1957, Ser. No. 692,750
4 Claims. (Cl. 260—674)

This invention relates to the separation and purification of components of a liquid multicomponent mixture. In one aspect it relates to the separation and purification of components of a liquid multi-component mixture by crystallization. In another aspect it relates to the separation and purification of a hydrocarbon from a mixture containing other hydrocarbons. In still another aspect it relates to method and apparatus for crystal separation and purification of liquid multicomponent mixtures.

This application is a continuation-in-part of application S.N. 375,516, filed August 20, 1953, now Patent No. 2,910,916.

The separation of chemical compounds by means of crystallization finds many applications in industrial installations. While separation by distillation or solvent extraction seems to be generally preferred, there are cases when these methods are impracticable or impossible and the desired separation can be effected only by means of crystallization. Thus when confronted with chemical isomers having similar boiling points and solubilities, or with materials having relatively high boiling ranges or with thermally unstable substances or with solutions containing both volatile and non-volatile impurities or undesired constituents, separation by crystallization may be the only method which can be advantageously employed. In one method of crystal separation a liquid multicomponent mixture is cooled so as the form crystals of at least a higher melting component and the crystals are thereafter separated from the mother liquor and introduced into a purification column through which they are moved in a compact contiguous mass. During their passage through the column, the crystals are refluxed, with material supplied either from outside the column or by melting a portion of the crystals in a melting section near the outlet of the purification column. When the latter refluxing method is employed, a portion of the melted crystals are withdrawn as product while the remainder of the melt is forced countercurrently to the movement of the crystals and in contact therewith so as to remove occluded impurities therefrom. One of the problems associated with this type of crystallization method and apparatus lies in providing optimum contact between the reflux liquid and the crystals passing through the purification column. Thus, it is desirable to prevent channeling of the reflux liquid through the crystal mass, or at least to keep such channeling to a minimum.

It is an object of this invention to provide an improved process for the separation of multicomponent mixtures.

Another object of the invention is to provide process and apparatus for the separation and purification of multicomponent mixtures by crystallization.

Still another object of this invention is to minimize channeling of reflux through the crystal mass in a process and apparatus for the purification of multicomponent mixtures by crystallization.

These and other objects of the invention will become more readily apparent from the following detailed description and discussion.

The foregoing objects are realized broadly by controlling the temperature of the region adjoining the outer surface of the purification zone whereby variations in said temperature and channeling through the crystal mass are reduced to a minimum.

In one aspect of the invention control of the temperature of the region adjoining the outer surface of the purification zone is provided by maintaining a fluid in contact with the outer surface of said zone.

In still another aspect of the invention, the fluid employed in contact with the outer surface of the purification zone is mother liquor separated from crystals during the purification process.

In yet another object of the invention the temperature of the fluid maintained in contact with the outer surface of the purification zone is varied in response to changes in the concentration of the higher melting component of the feed to the crystallization and purification zone.

The process and apparatus of this invention are applicable to a vast number of simple binary and complex multicomponent systems. The invention is particularly applicable to the separation of hydrocarbons which have practically the same boiling points, and are, therefore, difficult to separate by distillation. When high boiling organic compounds are concerned, separation by distillation is often undesirable because many such compounds are unstable at high temperatures. Specific examples of organic systems to which this invention is applicable are recited in U.S. Patent 2,727,001 and of particular importance, there may be mentoned separation of systems containing xylenes, systems containing cyclohexane, systems containing normal paraffins, and systems containing benzene, and the like. Thus, it has been found that para-xylene can be separated from a multicomponent mixture comprising isomeric alkyl benzenes, that benzene can be separated from a mixture comprising a paraffinic hydrocarbon and benzene, that 2-methyl-5-vinylpyridine can be separated from a mixture comprising 2-methyl-5-vinylpyridine and 2-methyl-5-ethyl pyridine and that cyclohexane can be separated from a mixture comprising a paraffinic hydrocarbon and cyclohexane. Other organic chemicals that may be mentioned include pyridines, dimethylphthalates and fatty acids.

It is not intended, however, to limit the invention to organic mixtures, but rather it is applicable to inorganic mixtures as well, and offers a practical method of separating two inorganic compounds between which solvates or hydrates are formed. Examples of inorganic systems to which this invention is applicable are those for the recovery of pure salts, such as ammonium nitrate, and of anhydrous salts from their hydrates.

In certain cases, it is desirable to recover the mother liquor separated from the crystals as a product of the process. This situation arises where it is desirable to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple and tomato. It is also possible to concentrate vegetable juices and beverages such as milk, beer, wine, coffee and teas by this method. This aspect of the invention is in general applicable in those instances where it is desired to increase the concentration of a solution by removing at least a portion of the solvent therefrom.

Many methods and apparatus known in the art can be used to effect crystallization and purification of the crystals in carrying out this invention. One well-known method, as disclosed in U.S. Patent No. 2,617,274, involves cooling a liquid multicomponent mixture from which the separation is to be made so as to form crystals of at least the higher melting component and thereafter separating the crystals from the mother liquor. The crystals are then introduced into a purification column in one end of which a melting section is maintained. By mechanical means, the crystals are moved in a compact, contiguous mass toward the melting section in the purification column where the crystals are melted. A portion of the melt is withdrawn as the product while the remainder is forced countercurrently to the movement of the crystals and in intimate contact therewith so as to remove therefrom the occluded impurities. Movement of crystals through the purification zone can be effected by any suitable means, such as by a piston, auger, or the like.

In carrying out the invention in one embodiment thereof, crystals contaminated with a material of different freezing point such as for example crystals of cyclohexane containing occluded normal heptane are introduced to a purification column, being passed therethrough as a uniform contiguous mass. In the course of their passage through the column, the crystals are contacted in countercurrent flow with a reflux material. This reflux material can comprise melted crystalline product, mother liquor previously filtered from the crystal mass or other suitable reflux material.

As a part of the crystal purification process, the temperature of the region adjacent to the outer surface of the purification column wall is controlled by bringing a fluid in contact with said column. The fluid employed can be either a liquid or gas, or combination thereof. Almost any non-corrosive material having satisfactory flow characteristics and heat capacity properties can be used. Usually it is preferred to make use of one of the conventional heat exchange materials such as liquid hydrocarbons like propane, butane, pentane, etc., alcohol, water, etc. The particular fluid material employed depends on the temperature which it is desired to maintain adjacent to the column wall. For example, if it is desired to employ a fluid having a temperature in the range of 0° C. or lower a refrigerating fluid such as ammonia, propane, methanol etc., is employed. On the other hand, if the wall temperature is controlled by employing a fluid at elevated temperatures it may be desirable to utilize a material such as heated air, water, low pressure steam, etc.

The fluid can be contacted with the surface of the purification zone in any manner desired, for example, this zone can be immersed in a body of the fluid and mixing or other means can be provided for circulating and maintaining the fluid in motion. As an alternative, fluid can be provided to a jacket surrounding the purification zone. For convenience of operation and access to the purification apparatus, it is usually preferred to employ a jacketed zone with fluid being circulated through said jacket to provide the desired temperature adjacent to the column wall.

The temperature of the fluid can vary over a relatively wide range depending upon the particular materials being processed in the purification column. For example, when separating paraxylene from a mixture comprising this material, ortho and meta-xylene, and ethylbenzene, the temperature in the column jacket can be maintained between about 20° F. below and 20° F. above the column feed temperature. On the other hand, when separating 2-methyl-5-vinylpyridine from 2-methyl-5-ethylpyridine, a jacket temperature of between about 10° F. below and about 55° F. above the feed temperature can be utilized; and when utilizing a feed material containing cyclohexane and normal heptane the jacket temperature can vary between about 5° F. below and about 45° F. above the feed temperature. The particular temperature range which can be used for the wide variety of materials which can be separated by crystallization in general lies between about 30° F. below and about 60° F. above the column feed temperature. The specific examples given are merely illustrative and the particular ranges to be employed in the treatment of feed materials are readily determined by those skilled in the art. The specific ranges given are merely illustrative of particular applications of the invention.

The flow rate of the fluid employed in the column jacket can vary over a relatively wide range. In general it is desirable that this rate be controlled so that the variation in fluid temperature during passage of the fluid through the jacket does not exceed more than about 10° F.

The process and apparatus of this invention provide substantial advantages over the methods and apparatus of the prior art in that they allow substantial increases of feed rate and improve product purity. The theory of the mechanism by which these desirable results are obtained is not clearly understood. It is known that the results are realized by controlling the temperature of the region adjacent to the outer wall of the purification column. Therefore it is believed that undesirable channeling which results when this region is not controlled is a result of variations in heat transfer through the column wall. It is to be noted from the preceding discussion and also from the specific examples, as hereinafter set forth, that the jacket temperature can be maintained either below or above the temperature of the feed material entering the purification column. Thus, in the case of para-xylene temperatures above and below the feed provide the desired results whereas in the systems containing 2-methyl-5-vinylpyridine and cyclohexane the jacket temperature is preferably maintained above the feed temperature. In any given separation the particular temperature employed is also an important factor since it has been found that improved results are obtained at certain temperature levels within the allowable operating temperature ranges. Thus, for example, in the para-xylene system it has been found desirable to maintain the jacket temperature between about 0 and about 15° F. below the feed temperature; in the 2-methyl-5-vinylpyridine system a temperature between about 15 and about 50° F. above the feed temperature is preferred; and in the cyclohexane system, the preferred temperature is between about 25 and about 40° F. above the feed temperature.

One factor in determining the desirable jacket temperature is the concentration of crystallizable material in the feed. Thus it has been found that the optimum jacket temperature, when expressed in the degrees differential between the fluid temperature and the column feed temperature, varies inversely with the amount of crystallizable product material in the feed (see FIGURE 11). As a result optimum operation of the purification column is obtained by varying the jacket fluid temperature in response to changes in the concentration of crystallizable product material in the feed.

Figure 4:
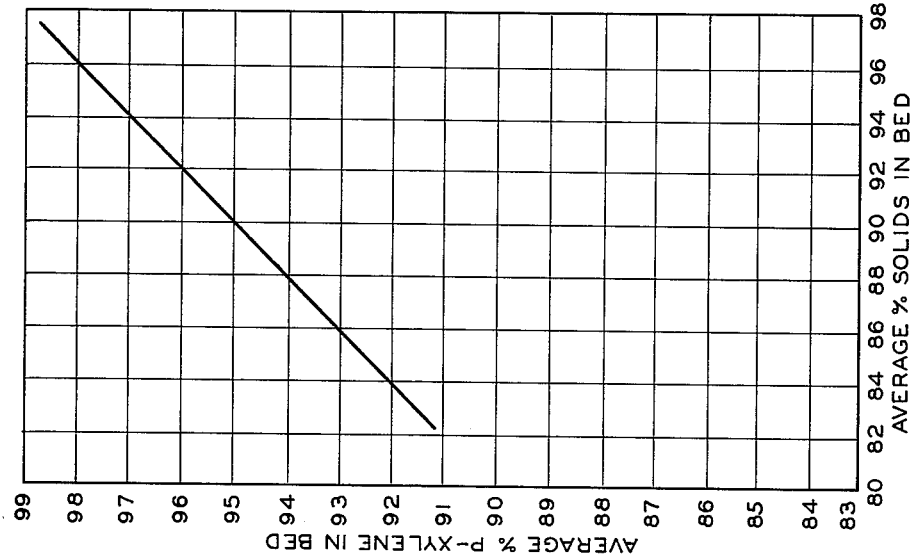
Figure 3:
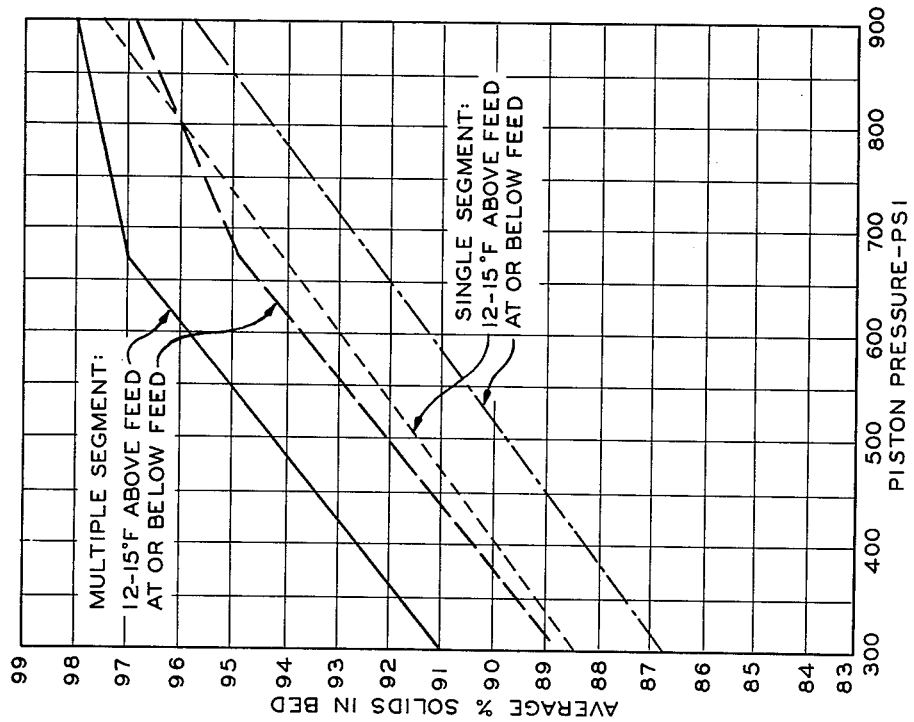
Figure 7:
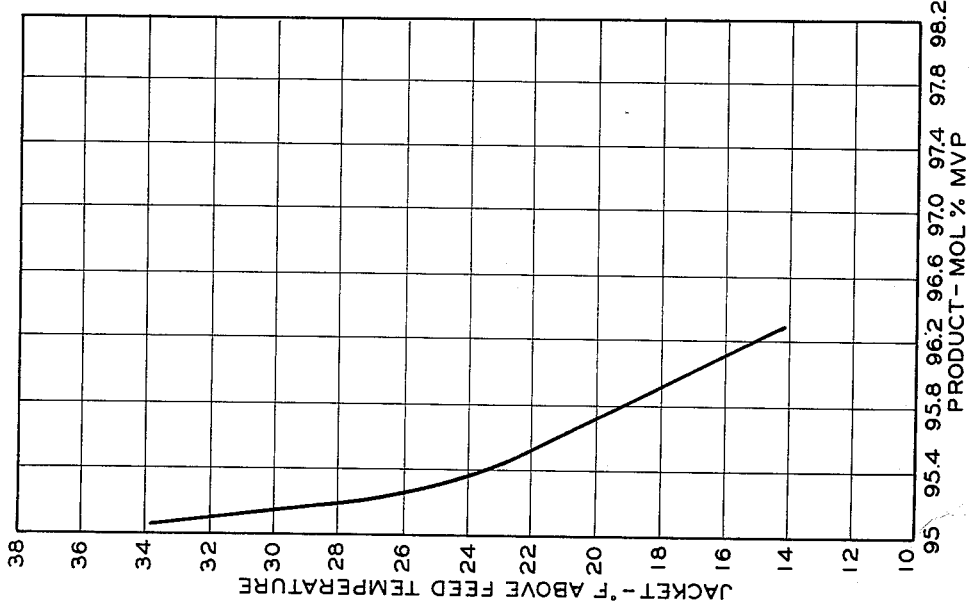
Figure 6:
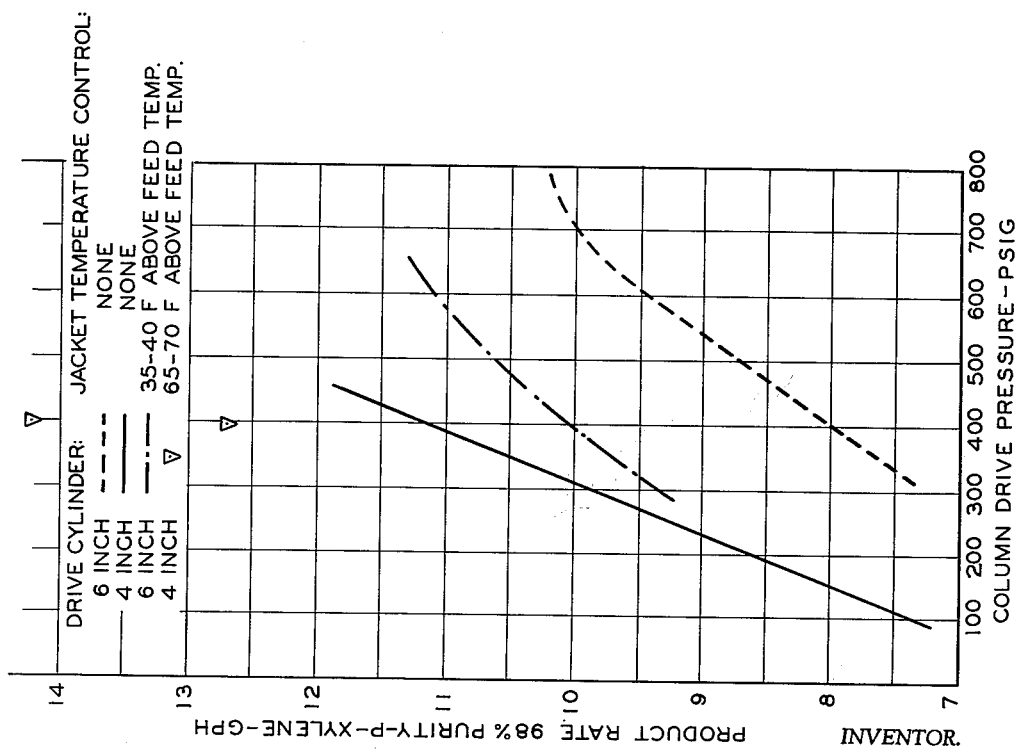
Figure 8:
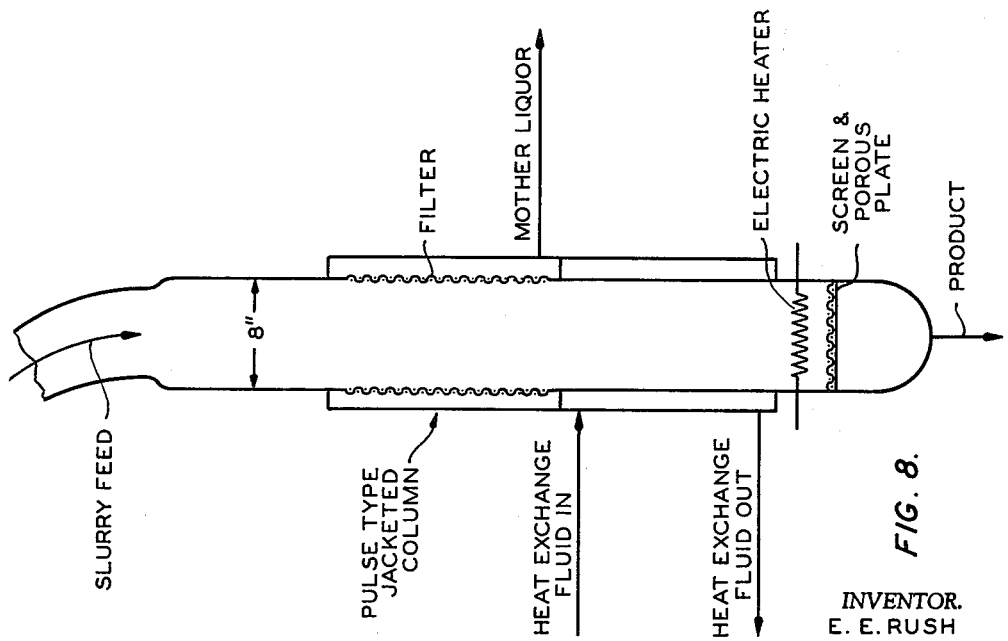
Figure 9:
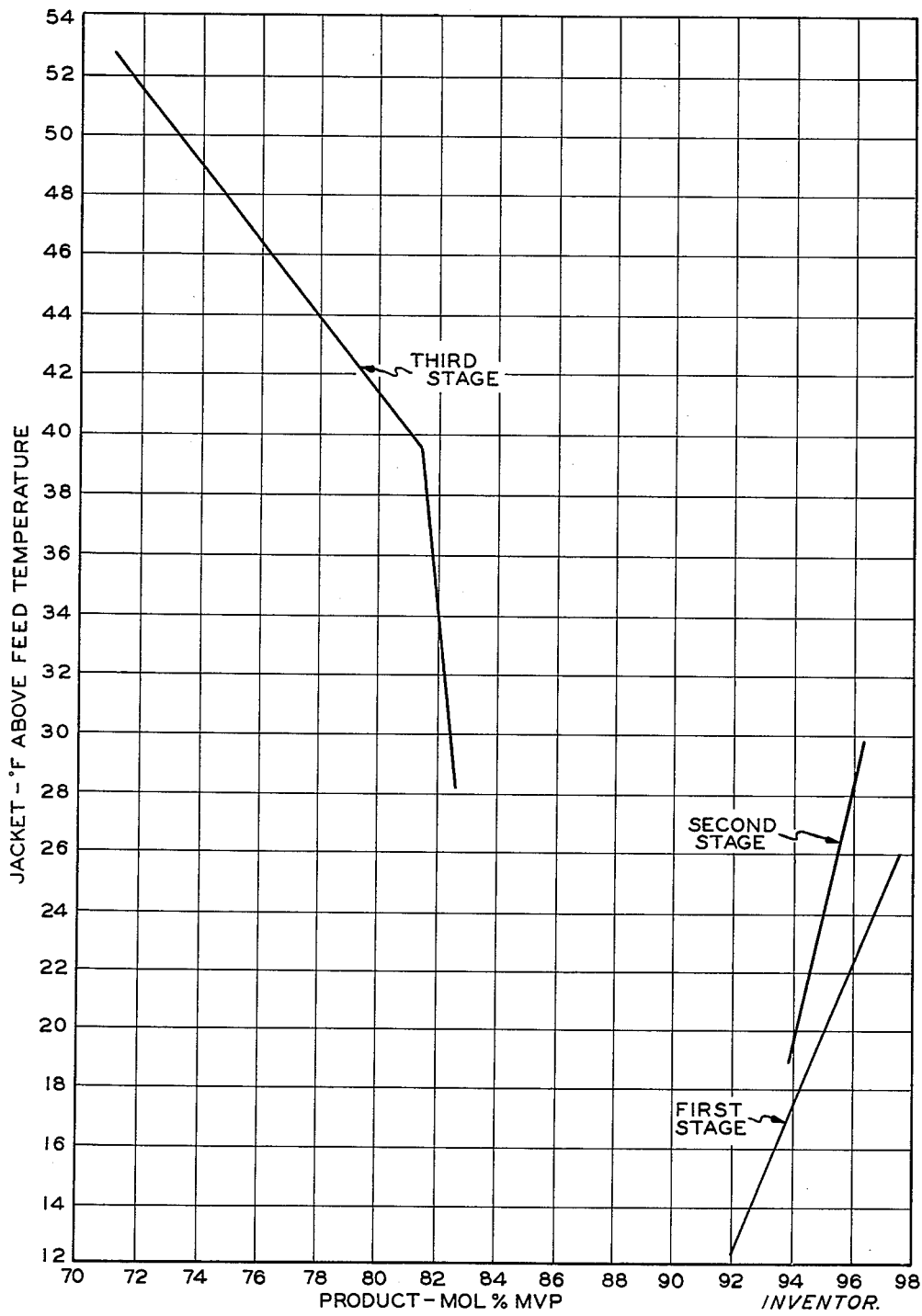

In order to more clearly describe the invention and provide a better understanding thereof reference is had to the accompanying drawings, of which:

FIGURE 1 is a diagrammatic illustration of an elevational view partly in section of apparatus suitable for carrying out the invention; and FIGURES 2 through 11 relate to apparatus utilized in various specific examples and plots of data from the examples, FIGURE 2 being a schematic drawing of the apparatus employed in Example 1;

FIGURES 3 and 4 being plots of data obtained in Example 2;

FIGURE 5 being a schematic drawing of the apparatus employed in Example 3;

FIGURE 6 being a plot of data obtained in Example 3;

FIGURE 7 being a plot of data obtained in Example 4;

FIGURE 8 being a schematic drawing of the apparatus employed in Example 5;

FIGURE 9 being a plot of data obtained in Example 5; and

Figure 11:
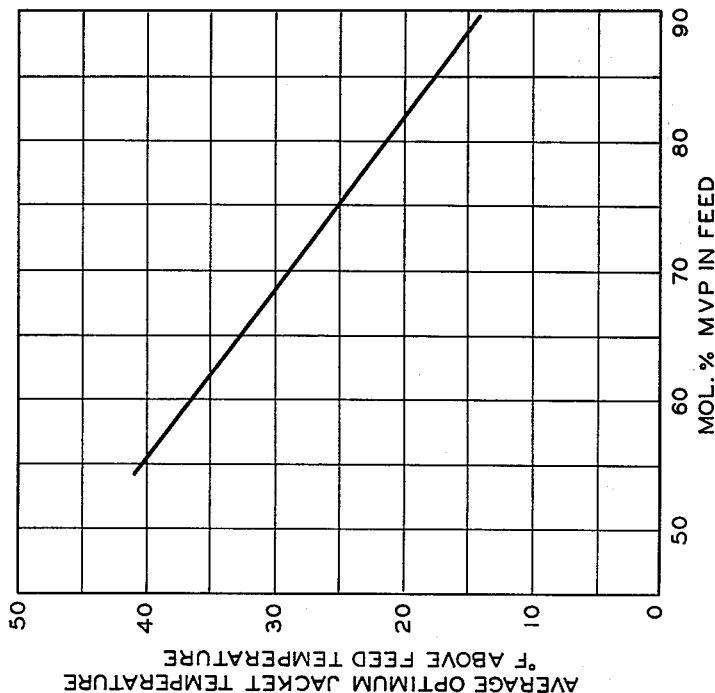
Figure 10:
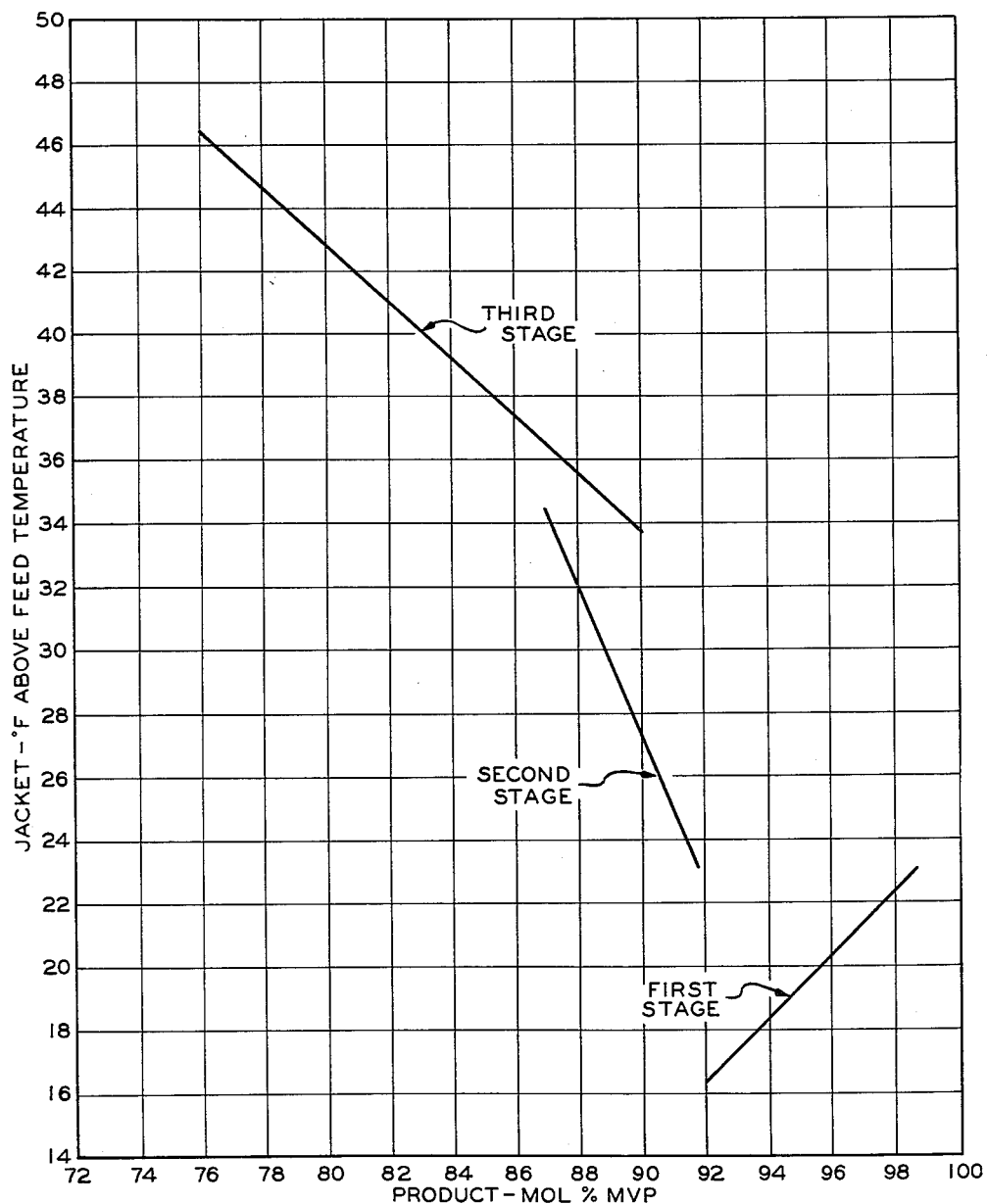

FIGURES 10 and 11 being plots of data obtained in Example 6.

Referring to FIGURE 1 an upright elongated column 10 is provided with upper and lower closure members 11 and 12, respectively and is divided into three principal sections, namely a scraped surface chiller 13, a filter section 14 and a crystal purification column 16. Scraped surface chiller 13 comprises a tubular member 17 provided with refrigerant means such as an annular jacket 18 which is provided with refrigerant inlet line 19 and refrigerant outlet line 20 whereby refrigerant is introduced into and withdrawn from the annular space between tubular member 17 and jacket 18. Scraper 21 which comprises a plurality of blades 22 attached to vertical shaft 23 by a series of cross members 24 is supported within tubular member 17 by means of upper and lower bearings 25 and 26 respectively. Cross members 24 and lower bearing 26 are constructed so as not to impede the flow of liquid and crystals through the chiller and may be in the form of a spider. Shaft 23 extends through upper closure member 11 and is operatively connected to a motor (not shown) thus providing means for rotating the scraper blades. Lead in line 27 communicating with the upper end of tubular member 17 contains a pressure gage 28 and a feed pump 29 and is connected to a source 31 of feed material.

Filter section 14 disposed immediately at the lower end of scraped surface 17 and connected thereto comprises a filter screen 32 substantially cylindrical in shape positioned within tube 33. Filter screen 32 is preferably made of a wire screening of a fineness of 30 to 150 mesh as so to permit liquid to pass therethrough while retaining the crystals. Line 72 containing valve 73 provides means for withdrawing the mother liquor and the reflux stream from the filter. If desired the mother liquor can be divided with a portion being yielded through conduit 74 and valve 75 and the remainder being recycled to the chiller through conduit 72 and valve 73.

Crystal purification column 16 is connected to filter 14 and comprises vertical tube 54 closed at its lower end by closure member 12. A heat exchange means 56 is provided at the lower end of column 16 in order to maintain a relatively high temperature at that point. In this particular instance the heat exchange means is an electrical heater which is positioned next to closure member 12 but other means for supplying heat can be employed. For example, a coil through which a heat transfer medium is passed can be disposed within or around column 16 at its lower end, or an electrical bayonet type heater can be provided to extend into the end of the purification column. Outlet 57 connected to the lower end of column 16 and containing pressure gage 58 and valve 59 provides means for withdrawing a controlled amount of higher melting product from the column. The crystal purification column 16 is provided with a jacketing means 76 which has connected thereto inlet line 77 and outlet line 78 whereby a fluid can be introduced into and withdrawn from the annular space between column 16 and jacket 76.

In the operation of the apparatus of FIGURE 1 a feed mixture from source 31 which can be a liquid multicomponent mixture, one component of which crystallizes first upon lowering the temperature of the mixture so as to form crystals contaminated with at least one other component, is introduced through line 27 into scraped surface chiller 13 under hydraulic pressure developed by feed pump 29. Refrigerant is passed into the annular space between tubular member 17 and annular jacket 18 through line 19 and withdrawn therefrom through line 20 at a rate sufficient to maintain scraped chiller 13 at a temperature low enough to crystallize one of the components. The feed mixture flows the entire length of the elongated column 10 and a superatmospheric pressure is maintained at the top of the chiller 13 through the operation of pump 29. Because of the low chiller temperature crystals of one component are frozen out thus forming a slurry of crystals and mother liquor. Scraper 21 is slowly rotated in order to remove any crystals forming on the walls of tubular member 17. The slurry of mother liquor and crystals flows downwardly through chiller 13 and enters filter section 14 where the crystals are separated from the mother liquor or lower melting product by removal of the liquid through line 72. The crystals together with occluded impurities then enter purification column 16 displacing the liquid therein and forming a uniform contiguous mass of crystals. By means of heater 56 the lower end of crystal purification column 16 is maintained at a temperature at least as high as the melting point of the crystals. The mass of crystals is moved downwardly through column 16 toward the high temperature by the combination of the force of gravity and hydraulic force exerted by the feed mixture entering the top of column 10. When reaching the high temperature end of column 16 the crystals are melted and a portion only of the resulting liquid is withdrawn through line 57 as product while the remainder of the liquid is displaced upwardly as a reflux stream through the downwardly moving mass of crystals, and in intimate contact therewith. The reflux stream is removed from column 10 through filter 14 with the mother liquor. During passage of the crystal mass through the purification column, a heat exchange fluid is passed through column jacket 76 whereby variations in temperature in the region adjacent to the wall of the column are reduced to a minimum. As a result substantially no channeling occurs through the crystal mass and a product of maximum purity is obtained.

The preceding example has been directed to the use of a crystallization and purification column wherein the motive force for passage of the crystals through said column is provided by combination of gravity and hydraulic force provided by the feed liquid. This is not intended however in any limiting sense and it is within the scope of the invention to employ crystallization and purification apparatus utilizing various means for forcing the crystals through the apparatus, including those previously discussed. While FIGURE 1 is directed specifically to the use of a colum jacket around the purification column, it is within the scope of the invention, in those instances wherein it is desired to introduce heat to the outer surface of the purification column, to utilize electrical heating means or other equivalent means.

The following examples are presented in illustration of various embodiments of the invention:

EXAMPLE 1 p-Xylene was separated from a mixture comprising p-xylene, o-xylene, m-xylene and ethylbenzene by crystallization in a jacketed, 4-inch diameter by 18¼ inch long carbon steel column. A 3⅞ inch diameter steel piston driven by 6 inch diameter double acting hydraulic cylinder supplied the force for drying and pressing xylene beds in the column. The piston face was perforated (3.9 square inch of openings) and fitted with a 25 x 110 mesh stainless steel screen. The base flange of the column was fitted with a 25 x 110 mesh stainless steel screen which was supported by a perforated steel plate containing 8.25 square inches of openings. The column base was equipped with a bottom tap to permit introduction of wash liquid or reflux below the bottom filter screen. The column is shown schematically in FIGURE 2.

A propane refrigerated scraped chiller supplied crystal slurry feed for the column. The chiller was a 6-inch diameter by 20 foot tube fitted with a scraper assembly which turned at 12 r.p.m.

Feed slurry was prepared by circulating the feed mixture through the scraped chiller then to a melt tank. Slurry was melted and recycled to the feed tank. A uniform crystal slurry was obtained by fixing feed stock composition, chiller feed rate and chiller outlet temperature. Slurry feed for the column was bled from the chiller outlet stream.

The column jacket was refrigerated with propane at a temperature approximately equal to that of the feed slurry. Slurry feed was introduced into the column at the top, the piston being raised clear of the top of the column. After each charge of the feed slurry the piston was moved down to partially dry the charge. Usually 4 charges of feed slurry were required to produce a compressed bed of 8 to 10 inch length. After the final charge was introduced drive pressure was supplied to the column through the piston and the entire bed was dried and pressed with a single final stroke of the piston. In a number of the runs multiple segment beds were employed, said beds being formed by drying and pressing each segment before the succeeding segment was formed above it.

Mother liquor was passed through the filters in the piston face and in the column base. The material removed through the porous face of the piston served as reflux and was pressured from a reflux vessel to the column base under controlled nitrogen pressure. Pressing of the crystal bed with the piston was continued while refluxing was being accomplished. At the end of the refluxing period the pressure was relieved from the piston drive unit and from the reflux line to the column base, the column was opened and the bed was removed.

A series of tests were carried out with a feed material containing 54 percent p-xylene, utilizing various piston pressures and reflux pressures, in which the column was operated with and without control of the jacket temperature. The results of these tests are presented in table I.

*Table I*

| Test No. | Column feed temperature, °F. | Jacket temperature, °F. | Piston pressure, p.s.i. | Reflux pressure, p.s.i. | Channels |
|---|---|---|---|---|---|
| 1 | +5 to +10 | (¹) | 405 | 100–200 | No. |
| 2 | −3 to +13 | (¹) | 405 | 200–350 | Yes. |
| 3 | +5 to +13 | (¹) | 900 | 450 | Yes. |
| 4 | +2 to −7 | (¹) | 900 | 450 | Yes. |
| 5 | −2 to +8 | (¹) | 900 | 450 | No. |
| 6 | +4 to +8 | (¹) | 675 | 350 | Yes. |
| 7 | +2 to +12 | (¹) | 340 | 200 | Yes. |
| 8 | +1 to +8 | (¹) | 340 | 150 | Yes. |
| 9 | 0 to +6 | (¹) | 340 | 250 | Yes. |
| 10 | +2 | (¹) | 225 | 100 | Yes. |
| 11 | +2 | −18 | 225 | 100 | No. |
| 12 | 0 | −15 | 225 | 100 | No. |
| 13 | | (¹) | 405 | 200 | Yes. |
| 14 | | (¹) | 405 | 200 | Yes. |
| 15 | +5 to +15 | (¹) | 405 | 200 | Yes. |
| 16 | +3 | −16 | 405 | 250–300 | No. |
| 17 | +1 | −13 | 675 | 350–400 | No. |
| 18 | +7 | −2 | 675 | 350–400 | No. |
| 19 | +5 to +10 | +13 | 675 | 350–400 | Slight. |
| 20 | +5 to +12 | +12 | 405 | 250–300 | No. |
| 21 | +10 to +14 | −3 | 405 | 250–300 | No. |
| 22 | +4 to +16 | +12 | 225 | 100–150 | No. |

¹ No control of jacket temperature.

It is noted from the table that in 11 out of the 13 tests in which the jacket temperature was not controlled, channeling of the crystal bed occurred. On the other hand in the 9 runs where control of the jacket temperature was maintained channeling occurred in only one run, and there only to a slight extent. It is further to be noted that the range of jacket temperature over which control of channeling was obtained included temperatures both above and below the column bed temperatures. It is apparent from this data that control of the column jacket temperature is an important factor preventing channeling through the crystal bed.

EXAMPLE 2

Additional tests were carried out for the separation of p-xylene from a mixture comprising p-xylene, o-xylene, m-xylene and ethylbenzene. The test column used in this series of tests was the same as that described in Example 1. To this column there was added a spiral wound Chromalox heater, mounted in a 1-inch thick steel ring, said heater being inserted in the base flange of the column for the purpose of providing heat at the base of the bed, to supply internal reflux.

A number of the tests of this example were carried out in crystal beds built up of several segments each about 2 inches deep. Each segment was separately dried and pressed before the succeeding segment was formed above it.

The procedure employed in carrying out the tests was substantially the same as that set forth in Example 1. Several tests were run with refluxing carried out with no pressure applied on the bed by the piston. Also, tests were run with heat supplied at the column base to provide internal reflux. As in Example 1, tests were carried out both with and without control of the jacket temperature. Methanol was used to provide control of the jacket temperature.

Results of tests are plotted in FIGURES 3 and 4. Referring to FIGURE 3, four curves are presented two of which relate to single segment beds and two to multiple segment beds. In each type of bed tests were conducted with the jacket temperature at or below the feed temperature and with the jacket temperaure maintained at 12 to 15° F. above the feed temperature. It is to be noted that in each type of bed maintaining the jacket temperature at 12 to 15° F. above the feed, rather than at or below the feed temperature, resulted in a substantial increase in the average percent solids in the bed.

FIGURE 4 which relates percent solids and percent purity of the xylene product, was prepared from the same data used in the preparation of FIGURE 3. Referring to FIGURE 4 it is noted that the average percent solids in the crystal bed is directly proportional to the average percent p-xylene in the same bed.

From a consideration of the two figures it is apparent that the average percent solids in the crystal bed, and thus the percent p-xylene, can be controlled by controlling the jacket temperature and can be varied depending on the particular temperature level at which the jacket is maintained. In this particular example the data illustrates that improved solids content and product purity are obtained by maintaining the jacket somewhat above the feed temperature.

EXAMPLE 3

In this example p-xylene was again separated from a mixture comprising p-xylene, o-xylene, m-xylene and ethylbenzene by crystallization. The equipment utilized was the same as that in Example 2 with the following changes: (a) A wall filter, containing 28 square inches of filter area, was installed beginning 2 inches below the feed port and extending to 7¾ inches below the feed port; (b) the column jacket was modified to cover only the section of the purification column below the wall filter; (c) both 6 inch and 4 inch drive cylinders were utilized to supply the force for drying and pressing xylene beds in the column.

A schematic drawing of the column is shown in FIGURE 5.

A series of tests were carried out with column drive pressures varying between 100 and 800 p.s.i.g. and at various product rates, to provide 98 percent purity p-xylene product. The operating conditions included feed temperatures in the range of −0 to −10° F., piston pressures from 250 to 790 p.s.i. and runs both with and without jacket temperature control. The results of these tests are presented in FIGURE 6.

Referring to the figure it is noted that the effect of controlling the jacket temperature as compared to no jacket temperature control is to substantially increase the product rate with other conditions maintained constant. Thus, when utilizing a 6 inch drive cylinder, controlling the jacket temperature at 35 to 40° F. above the feed temperature with a column drive pressure of 400 p.s.i.g., gives a product rate of 10 gallons per hour as compared to 8 gallons per hour with the jacket temperature uncontrolled. Under similar conditions with a 4 inch drive cylinder, controlling the jacket temperature results in a product rate of about 13.5 gallons per hour as compared to 11 gallons per hour without jacket temperature control.

EXAMPLE 4

In this example 2-methyl-5-vinylpyridine was separated from a mixture comprising 2-methyl-5-vinylpyridine and 2-methyl-5-ethylpyridine by crystallization. The equipment utilized in carrying out the tests was the same as that employed in Example 3 with the exception that the filter area was changed to 27.5 square inches.

A series of tests were carried out with different jacket temperatures under the following conditions: Feed temperature, 0 to —7° F., feed composition 82.4–84 mol percent 2-methyl-5-vinylpyridine, jacket temperature 8 to 31° F., column pressure 50 to 150 p.s.i. and product rate 3 to 21 gallons per hour. The results of the tests are plotted in FIGURE 7.

The data of FIGURE 7 illustrate the effect of varying jacket temperatures on product purity and show that product purity increases when the jacket temperature is maintained in the range of 14 to 25° F. above the feed temperature.

EXAMPLE 5

In this example 2-methyl-5-vinylpyridine was again separated from 2-methyl-5-ethylpyridine by crystallization. The tests were conducted in an 8 inch diameter pulse type column. A sketch of this column is shown in FIGURE 8 attached. The column was equipped with a pancake type electrical heater rated at 4400 watts at 240 volts. Crystal slurry for the column was prepared using a precooler (propane cooled exchanger) and the 6 inch diameter by 20 feet scraped surface chiller. The pulse unit (which is not shown in FIGURE 8) was a Milton-Roy plunger pump without check valves, with 1½ inch bore and with the stroke adjustable from 0 to 4 inches. A variable speed drive for the pump provided speeds from 32 to 220 cycles per minute.

A series of tests were carried out to simulate three stage crystallization operation with the feed material to the first stage comprising about 86 mole percent 2-methyl-5-vinylpyridine at a feed temperature of about —10° F., the second stage feed comprising about 75 mole percent 2-methyl-5- vinylpyridine and a feed temperature of about —25° F. and the third stage comprising about 58 mole percent 2-methyl-5-vinylpyridine at a feed temperature of about —40° F. In carrying out the tests the jacket temperatures were varied from —4 to +14° F., the column pressure varied from 100 to 200 p.s.i. and the product rate ranged from 10 to 50 gallons per hour. The effect of jacket temperature on the purity of the product is presented in FIGURE 9 for each of the three stages.

Referring to the figure it is to be noted that high quality products are obtained by employing different jacket temperatures in each stage. It is further to be noted that the purity of product in each stage can be varied and improved by varying the particular jacket temperature employed.

EXAMPLE 6

2-methyl-5-vinylpyridine was again separated from 2-methyl-5-ethylpyridine by crystallization. Equipment employed in carrying out these tests was the same as that used in Example 5 with the following revisions: (1) a 10 inch pulsed column was used in place of the 8 inch column, (2) the Milton-Roy pulse unit was altered to permit a maximum stroke length of 5 inches instead of the former 4 inch length.

The results of varying jacket feed temperature on the purity of the product were similar to those in Example 5 and are presented in FIGURE 10. The data of FIGURE 10 illustrate again the effect of varying jacket feed temperatures on the quality of the product obtained.

In each of the Examples 4, 5 and 6 the average optimum jacket temperatures were determined and were compared with the mol percent 2-methyl-5-vinylpyridine in the feed to the crystallizer. The results are plotted in FIGURE 11. Referring to this figure it is noted that the optimum jacket temperature varies with the percent 2-methyl-5-vinylpyridine in the feed and decreases as the amount of this material in the feed increases.

EXAMPLE 7

In this example, cyclohexane was separated from a mixture of cyclohexane and normal heptane. The equipment employed in carrying out these tests was similar to that utilized in Examples 5 and 6, except that a six-inch diameter pulsed column was used. The conditions employed and the results obtained from the tests are shown in Table II.

*Table II*

| Run No. | Run duration, hours | Column temperatures, °F. | | | | | Average pressures, p.s.i.g. | | | |
|---|---|---|---|---|---|---|---|---|---|---|
| | | Chiller outlet | Mother liquor | Jacket In | Jacket Out | Product | Chiller feed | Chiller outlet | Mother liquor | Product |
| 1 | 4 | —26 | —5 | 4 | 13 | 57 | 120 | 173 | 84 | 173 |
| 2 | 4 | —23 | —11 | (²) | (²) | 56 | 120 | 173 | 83 | 173 |
| 3 | 5 | —25 | —7 | —1 | 7 | 60 | 120 | 174 | 113 | 172 |
| 4 | 4 | —25 | —5 | 2 | 11 | 60 | 120 | 173 | 140 | 175 |

| Run No. | Pulse unit | | Average flow rates, g.p.h. | | | Stream composition, weight percent cyclohexane | | | Slurry, weight percent solids | Crystal recovery factor ¹ |
|---|---|---|---|---|---|---|---|---|---|---|
| | Frequency, c.p.m. | Stroke, in. | Feed | Mother liquor | Product | Feed | Mother liquor | Product | | |
| 1 | 170 | 4.0 | 21.2 | 16.0 | 5.2 | 85.1 | 81.5 | 99.0 | 29.8 | 0.83 |
| 2 | 170 | 4.0 | 18.0 | 14.2 | 3.8 | 86.1 | 82.5 | 99.0 | 31.9 | 0.66 |
| 3 | 170 | 4.0 | 26.9 | 20.4 | 6.6 | 85.9 | 83.0 | 99.0 | 33.7 | 0.73 |
| 4 | 170 | 4.0 | 20.7 | 16.2 | 4.5 | 86.0 | 83.0 | 99.0 | 33.3 | 0.66 |

¹ G.p.h. of product x volume percent cyclohexane in product/g.p.h. of solids.
² No mother liquor used in jacket in Run No. 2.

As noted from the tests of Table II, the use of mother liquor in the column jacket allows increased feed rates and substantially improves the crystal recovery factor.

Having thus described the invention by providing specific examples thereof, it is to be understood that no undue limitations or restrictions are to be drawn by reason thereof and that many variations and modifications are within the scope of the invention.

I claim:

1. A continuous process for separating a crystallizable component from a liquid multi-component mixture which comprises cooling said mixture so as to crystallize said component, separating the crystals from the lower melting components of said mixture, passing said crystals through a purification zone as a uniform contiguous mass, passing a reflux liquid in countercurrent flow through said crystal mass, passing a fluid of controlled temperature in contact with the outer surface of the purification zone to maintain the region adjoining said surface at a substantially uniform temperature within the range of between about 30° F. below and about 60° F. above the temperature of the crystals entering said zone, varying the temperature of said region so that the temperature differential between the temperature of said fluid and the temperature of the column feed mixture is inversely proportional to the concentration of crystallizable component in the multi-component mixture, and recovering a purified crystal product from said zone.

2. The process of claim 1 in which para-xylene is separated from a mixture comprising para-xylene, ortho-xylene, meta-xylene and ethylbenzene.

3. The process of claim 1 in which 2-methyl-5-vinylpyridine is separated from a mixture comprising 2-methyl-5-vinylpyridine and 2-methyl-5-ethylpyridine.

4. In apparatus for the separation and purification of crystals which comprises a cooling chamber, a feed inlet communicated to said cooling chamber, means for separating liquid from said crystals communicating with the downstream end of said cooling chamber, a liquid outlet connected to the separating means, an elongated purification chamber in communication with said separating means, a jacket surrounding said chamber intermediate the ends thereof, means for introducing a fluid to and withdrawing a fluid from said jacket, a heat exchange means separate from said jacket operatively connected to the lower end of said purification chamber below the jacketed zone and a liquid outlet in the lower end of said purification chamber.

References Cited in the file of this patent

UNITED STATES PATENTS

| | | |
|---|---|---|
| 2,731,456 | Weedman | Jan. 17, 1956 |
| 2,747,001 | Weedman | May 22, 1956 |
| 2,874,199 | Tarr | Feb. 17, 1959 |
| 2,894,997 | Hachmuth | July 14, 1959 |